(12) United States Patent
LaMaster et al.

(10) Patent No.: US 7,159,510 B2
(45) Date of Patent: Jan. 9, 2007

(54) VERTICALLY ORIENTED JERKY DEHYDRATOR

(76) Inventors: Alan L. LaMaster, Rt. 1 Box 417-13, Highview, WV (US) 26808; John E. Wisdo, 2028 Wardensville Pike, Star Tannery, VA (US) 22654

( * ) Notice: Subject to any disclaimer, the term of this patent is extended or adjusted under 35 U.S.C. 154(b) by 349 days.

(21) Appl. No.: 10/771,686

(22) Filed: Feb. 5, 2004

(65) Prior Publication Data

US 2005/0172835 A1   Aug. 11, 2005

(51) Int. Cl.
A47J 37/06 (2006.01)
A47J 37/07 (2006.01)
A47J 37/08 (2006.01)

(52) U.S. Cl. ............................ 99/399; 99/393; 99/349; 99/402; 99/427; 99/450

(58) Field of Classification Search .................. 99/393, 99/394, 402, 391, 396, 395, 399, 351, 349, 99/353, 450, 427, 448
See application file for complete search history.

(56) References Cited

U.S. PATENT DOCUMENTS

| | | | | |
|---|---|---|---|---|
| 237,286 | A | * | 2/1881 | Johnson et al. ............... 99/402 |
| 1,794,870 | A | * | 3/1931 | Serrell ........................ 99/402 |
| 2,941,463 | A | * | 6/1960 | Di Cuia ....................... 99/393 |
| 2,975,698 | A | * | 3/1961 | Miller ......................... 99/390 |
| 3,033,100 | A | * | 5/1962 | Wagner ....................... 99/402 |
| 3,379,118 | A | | 4/1968 | Perez |
| 3,704,141 | A | * | 11/1972 | Grossman ................... 99/397 |
| 4,152,842 | A | | 5/1979 | Laughlin |
| D252,397 | S | | 7/1979 | Cousins et al. |
| 4,338,912 | A | | 7/1982 | Gaskins |
| 4,409,743 | A | | 10/1983 | Jespersen et al. |
| 4,452,131 | A | * | 6/1984 | Gaskins ....................... 99/402 |
| 4,559,869 | A | | 12/1985 | Hogan |

(Continued)

OTHER PUBLICATIONS

"Baker Jerky Maker Kit"—www.ovenjerkymaker.com—date unknown.

(Continued)

*Primary Examiner*—Reginald L. Alexander
(74) *Attorney, Agent, or Firm*—Hoffman, Wasson & Gitler, P.C.

(57) ABSTRACT

A jerky dehydrator comprises several baskets for receiving and retaining the product to be dehydrated and a racking grid for retaining several baskets in a vertical orientation. The racking grid is inserted into a metal tray, and the tray is inserted into the oven of a household range. The oven is preheated, prior to inserting the tray and its contents. Subsequently, the oven is maintained at a low temperature, about 200°, and the door of the oven is held open, slightly, to allow moisture to escape. Each basket comprises a first grate and a second grate, retained in pivotal relation by a pair of hinge clips. Tension springs, secured to an anchor on one grate and an extension on the other grate, urge the grates togther to form a basket and retain the jerky therebetween during the dehydration process. Receptacles at the trailing edge of one grate slip over upstanding pins on the racking grid and lock each basket in its vertical orientation. A form may be used to mold the jerky into a patty or square, of desired dimensions, prior to inserting same into the basket.

7 Claims, 6 Drawing Sheets

U.S. PATENT DOCUMENTS

| | | |
|---|---|---|
| D318,206 S | 7/1991 | Watznauer |
| 5,365,834 A * | 11/1994 | Sidoti .................. 99/450 |
| 5,423,249 A | 6/1995 | Meyer |
| 5,437,108 A | 8/1995 | Alseth |
| 5,440,825 A | 8/1995 | Thompson et al. |
| 5,562,023 A | 10/1996 | Harrison |
| 5,650,085 A | 7/1997 | Chen |
| 5,735,191 A | 4/1998 | Russell et al. |
| D401,468 S | 11/1998 | Knoll et al. |
| 5,878,508 A | 3/1999 | Knoll et al. |
| 5,974,957 A | 11/1999 | Ysen |
| 6,085,442 A | 7/2000 | Erickson |
| 6,244,167 B1 * | 6/2001 | Mc Carney .................. 99/349 |
| RE37,955 E | 1/2003 | Kiczko et al. |

OTHER PUBLICATIONS

"Mother's" 2 hour jerky maker—BowhuntingStore.com, date unknown.

News from U.S. Consumer Product Safety Commission—Aug. 17, 1995, CPSC, American Harvest Inc. Announce Food Dehydrator Recall.

"The Excalibur Dehydrators", Nutrition Lifestyles, www.nutritionlifestyles.com, date unknown.

"The Air Preserve II Dehydrator", Nutrition Lifestyles, www.nutritionlifestyles.com, date unknown.

Pleasant Hill Grain Dehydrators, www.pleasanthillgrain.com, date unknown.

* cited by examiner

VERTICALLY ORIENTED JERKY DEHYDRATOR

FIELD OF THE INVENTION

The instant invention pertains generally to a jerky dehydrator, and more particularly to a spring loaded basket that is secured to a racking grid, in a vertical orientation, for dehydrating the jerky contained within the basket.

BACKGROUND OF THE INVENTION

The preservation of food by dehydration has long been recognized. The earliest efforts at dehydration involved placing the food product, in an open container, for exposure to the sun and ambient conditions.

In more recent years, food dehydrators, with motor driven fans or blowers to force heated air through a cabinet or housing, and multiple shelves to receive the product to be dehydrated, have been developed for home use. A few of the many dehydrators developed for home use are discussed below.

To illustrate, U.S. Pat. No. 3,943,842, Bills et al, discloses a cabinet dehydrator (10) for long term preservation of food under close control of time, temperature, and humidity. Blower (32) obtains intake air from the surrounding atmosphere and forces same into the interior of the cabinet. As shown by the directional arrows in FIG. 1, the air passes over heater coil (50), through port (66) into the interior of the cabinet, and then circulates laterally between horizontally disposed trays (70). Baffles (80) are manually set to control the amount of hot air displaced across a given tray, or shelf. A circuit, shown in FIG. 8, regulates the rate at which moisture is withdrawn from the food being dehydrated. The circuit shown in FIG. 9 regulates the air temperature within the cabinet of the dehydrator.

U.S. Pat. No. 6,085,442, Erickson, discloses a modular food dehydrator (20), utilizing a heater blower assembly (34) located on a top surface of a dehydrator module as shown in FIG. 1. The heater blower assembly includes a motor driven fan (140, 142—see FIG. 6), a heating element (resistance wire 144), and an air distribution portion (housing 106 with distribution ports 114, 118, 120, 122) for directing heated air across the support surfaces. The heater blower assembly is reliably attachable to the dehydrator module. Space supports (72) maintain a gap between adjacent, horizontally disposed food trays (24, 25, 28) and serve as outlet vents to facilitate circulation of the heated air.

Similar food dehydrators, with horizontally stackable trays or shelves, are disclosed in U.S. Pat. No. 5,423,249, granted Jun. 13, 1995, to Michael F. Meyer, in U.S. Pat. No. 5,437,108, granted Aug. 1, 1995, to Steven Alseth, and in U.S. Pat. No. 5,878,508, granted to John L. Knoll et al. All three patents are assigned to American Harvest Inc., of Chaska, Minn.

The several dehydrators discussed above rely upon one or more trays, or shelves, retaining the food to be dried, within the interior of a cabinet or housing, in fixed position in parallel horizontal planes. Heated air is blow over the food, on the trays, to dry same; baffles, fans, porting, etc. control the circulation of heated air over the food retained on the trays, with varying degrees of effectiveness.

A different approach to preparing meat jerky, and other dehydrated foods, is disclosed in U.S. Pat. No. 5,974,957, granted Nov. 2, 1999, to David A. Ysen. The rotating food dehydrator includes a base (12) with an interior space, (as shown in FIG. 1). A food supporting mechanism, including trays (40), is supported by rotisserie assembly (32) with two sets of radially extending arms (36), (as shown in FIGS. 3 and 4). A heating mechanism, such as heating assembly (30), is adapted for generating heat within the interior of the dehydrator. Fans (25, 26, 28) circulate air about the food on the trays. The food supporting mechanism moves with respect to the air circulation mechanism, or system, during use of the dehydrator.

The electrically powered dehydrators discussed above represented a significant advance in efficiency over rudimentary dehydrators relying upon drying action, or curing, by exposure to the sun. However, the electrically powered dehydrators possessed certain disadvantages and operating deficiencies. For example, known dehydrators are bulky and consume significant space, both on a counter top, when in use, or in a storage area, when not in use.

Known dehydrators employ several horizontally disposed racks to receive the meat jerky, and difficulty is encountered in circulating air through the racks to evenly dry the contents of the racks. Blowers, vents, and louvers, are required in an effort to provide a degree of uniformity to the heated air to be circulated, and known dehydrators are thus relatively costly to purchase, operate and maintain. Also, the fat content in the jerky retained on the upper racks drips down onto the lower racks, thus diminishing the quality, and taste, of the product on the lower racks.

In order to overcome the shortcomings of known dehydrators in the areas of cost, complexity, uniformity of product, counter storage space, etc., the inventors have devised a simplified, vertically oriented dehydrator, utilizing a spring loaded basket, a racking grid, and a tray to receive the raking grid with several baskets secured thereto in a vertical orientation. The baskets are formed of first and second grates retained together by metal hinge clips. Receptacles on the grates are secured to upstanding pins on the racking grid to achieve vertical orientation.

The racking grid, after loading with the baskets locked thereon, is placed into an upwardly opening tray. The tray and its contents are inserted into a conventional oven for drying the jerky, or similar food product, in a simple, and efficient manner, at low temperatures, for a relatively short period of time.

BRIEF SUMMARY OF THE INVENTION

The instant invention relies upon a basket formed of two metal grates of different configurations to retain jerky therebetween; tension springs bias the grates together. Hinge clips secured to one edge of each grate, allows the grates to be pivoted relative to one another, to trap the contents of the basket. Tension springs extend between anchors on one grate and horizontal extensions at the upper end of the cooperating grate. Receptacles secured to the trailing edge of one of the grates secures the baskets to a racking grid.

The racking grid, with several pairs of upstanding, vertically oriented pins, is employed to retain several baskets in vertical orientation. Each basket receives a volume of jerky to be dried, and several baskets are used with each racking grid. The jerky may be shaped in a form to obtain a desired shape, and appropriate dimensions.

The receptacles on each basket are slipped over mating pins on the racking gird, so that the baskets are aligned, parallel to each other, and vertically oriented. The racking grid, with the baskets secured thereto, is placed into an upwardly opening tray, and the loaded tray is introduced into an oven to dry the jerky. Heated air circulates evenly about the baskets and uniformly dries the contents thereof; the drippings are collected in the tray, so that clean-up time is minimized.

In a preferred embodiment, which finds particular application when a meat product is intended to be sliced, after cooking, into strips, the jerky is formed into a patty prior to introduction into each rack. The method of forming the patty is unique, for a generally rectangular open form receives a charge of jerky, the dimensions of the patty are chosen to fit neatly within each basket, and contribute to the successful operation of the dehydration process.

Furthermore, herbs, vegetables or fruits, which do not require slicing after cooking, can be dehydrated within the racking grids, without utilizing the generally rectangular form to make patties. The proper amount of herbs, vegetables or fruits, to be introduced into each basket, can be visually determined by the user of the dehydrator, after a few attempts to master the technique.

While the invention is designed for use in the home, the invention could easily be adapted for use on a commercial scale. The dehydration process is conducted at relatively low temperatures, so that the resulting jerky is tasty and uniform in shape, consistency and doneness throughout the unit. Shrinkage of the product being dehydrated is also kept well within acceptable limits.

DETAILED DESCRIPTION OF THE PREFERRED EMBODIMENT

Figure 1A:
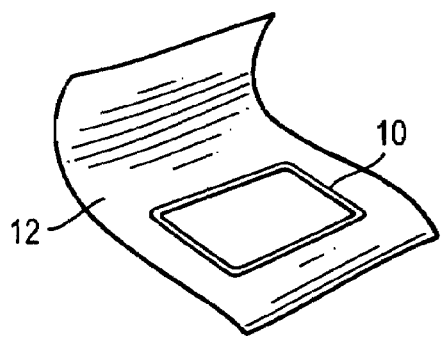
FIGS. 1A–1H show, in sequence, the several steps involved in the formation of a patty of jerky to be dried.

FIGS. 1A–1H depict, in schematic fashion, the sequence of steps used to prepare ground jerky for introduction into the dehydrator constructed in accordance with the principles of the instant invention. FIG. 1A shows form 10, of rectangular shape, placed on top of a sheet of non-stick paper 12. The non-stick paper may be parchment, wax paper, or aluminum foil, and the sheet of non-stick paper may be twenty four inches in length. Form 10 is positioned to leave a buffer, or margin, of two inches on each side and at the end of the paper.

Figure 1B:
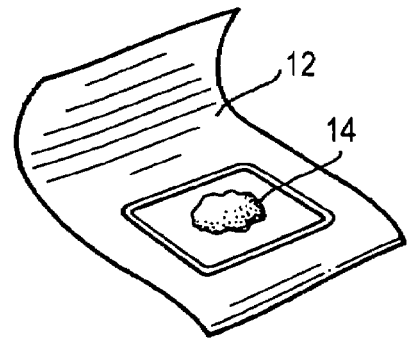
Figure 1C:
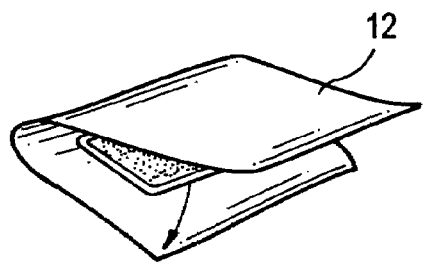
Figure 1D:
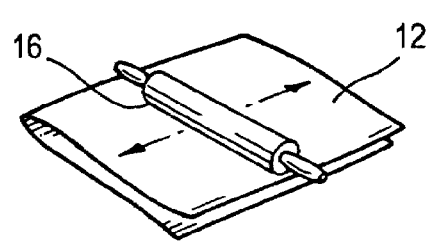

A scoop, or handful, of ground jerky 14 is placed within form 10, as shown in FIG. 1B. The scoop may contain three-quarters of a pound of jerky, seasoned according to the user's recipes. The upper end of paper 12 is then folded over the top of form 10, so that the edges of the upper and lower runs of paper 12 are in alignment, as shown in FIG. 1C. Rolling pin 16 is then rolled back and forth across the upper surface of folded over paper 12, as shown in FIG. 1D, to distribute ground jerky 14 throughout form 10. Excess jerky (now shown) will flow over the form 10, and can be recovered from paper 12 for use in the next scoop of jerky.

Figure 1E:
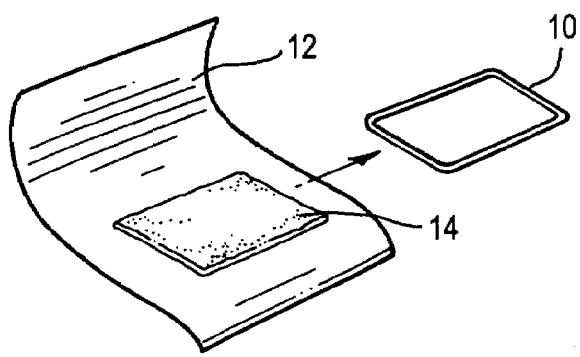

Paper 12 is then opened to allow removal of form 10, as shown in FIG. 1E. The jerky 14 has been molded, or defined, into a rectangular patty.

Figure 1F:
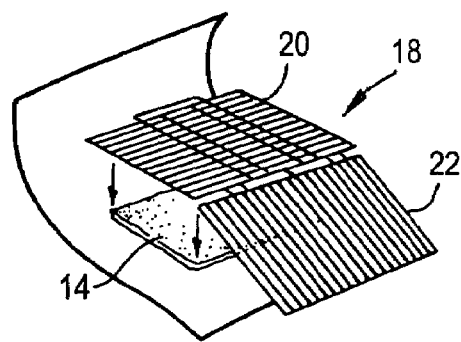

Basket 18 is then swung open, and first grate 20 is positioned atop the patty of jerky 14, as shown in FIG. 1F.

Figure 1G:
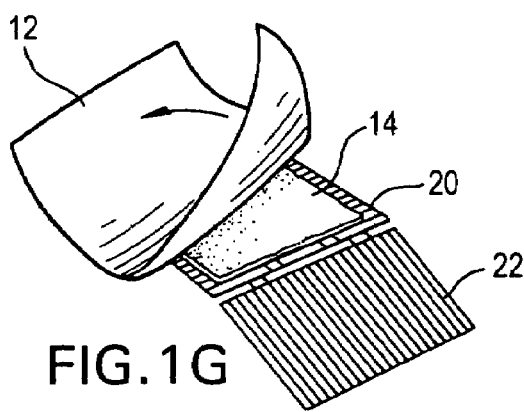
Figure 1H:
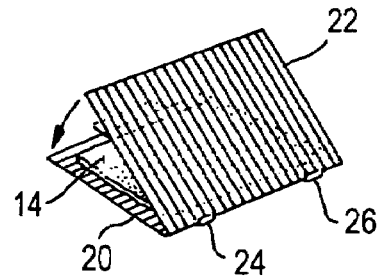

First grate 20 is flipped over, and paper 12 is removed, as shown by the directional arrow in FIG. 1G. Second grate 22 is then pivoted about hinge clips 24, 26 toward companion grate 20, to trap the formed ground jerky 14 therebetween.

Figure 2:
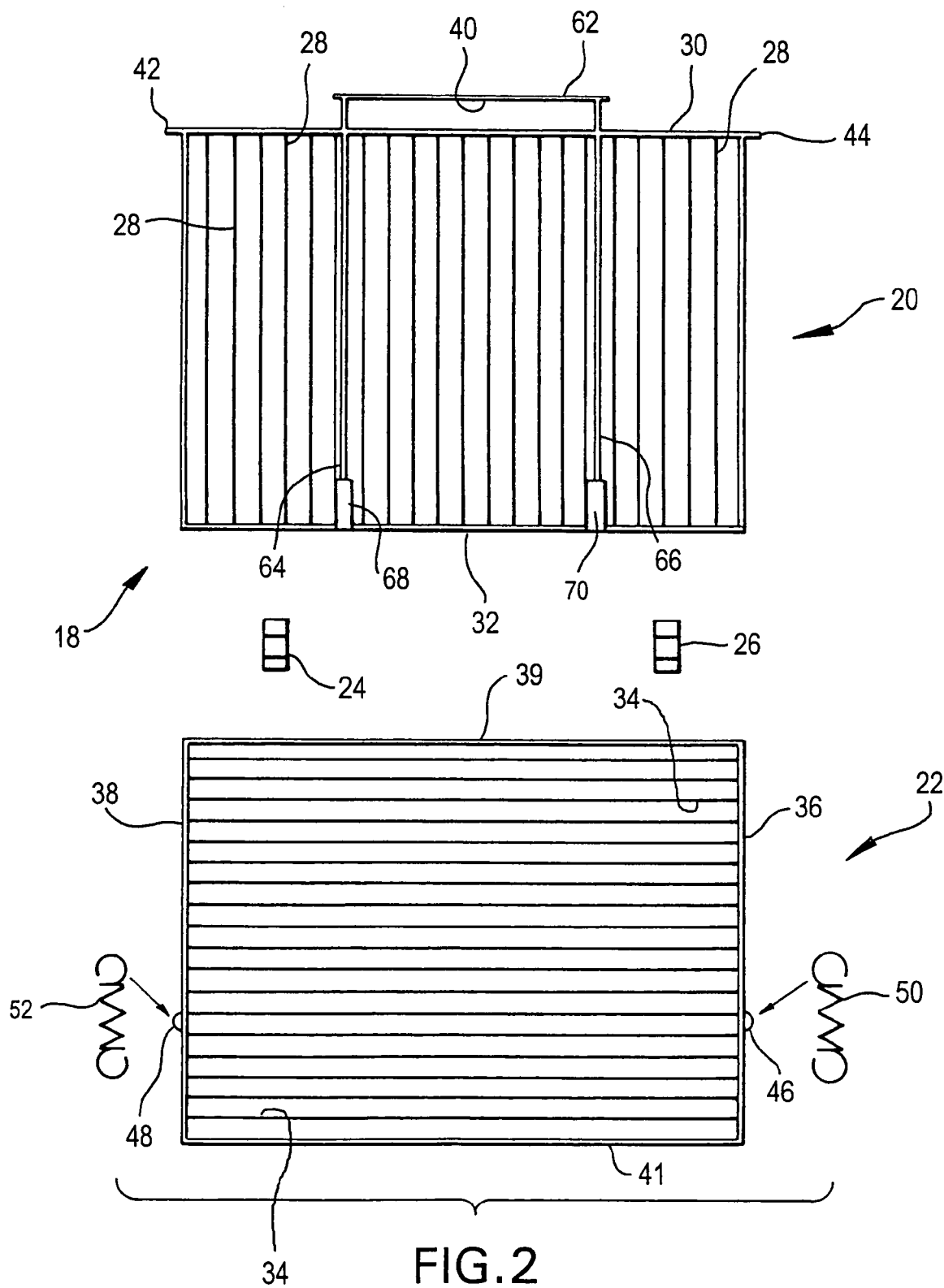
FIG. 2 is a plan view of the components of a basket, constructed in accordance with the principles of the instant invention, prior to assembly.

FIG. 2 shows the components of basket 18 prior to assembly. The components include first grate 20, second grate 22, and hinge clips 24, 26. The several evenly spaced parallel rods 28 that comprise grate 20 extend in a vertical plane and are welded, or otherwise joined between upper horizontal rod 30 and lower horizontal rod 32. The several, spaced parallel rods 34 that comprise second grate 22 extend in a horizontal plane, and are welded, or otherwise joined, between side members 36 and 38. The leading edge of second grate 22 is indicated by reference numeral 39 in FIG. 2, while the trailing edge is indicated by reference numeral 41. Rods 28 on first grate 20 are perpendicular to rods 34 on second grate 22.

An inverted U-shaped handle 40 is defined above upper rod 30 of first grate 20. Upper rod 30 projects beyond the outermost rod 28 on each side of first grate 20. The extension on the left side of first grate 20 is indicated by reference numeral 42, while the extension on the right side is indicated by reference numeral 44.

Anchor 46 is secured to one side member 36 of second grate 22, while anchor 48 is secured to the opposite member 38, in a matching location, below the horizontal midpoint. One end of tension spring 50 is secured to anchor 46, and the opposite end is secured to extension 44 on first grate 20. One end of tension spring 52 is secured to anchor 48, and the opposite end is secured to extension 42 on first grate 20.

Figures 5, 5A:
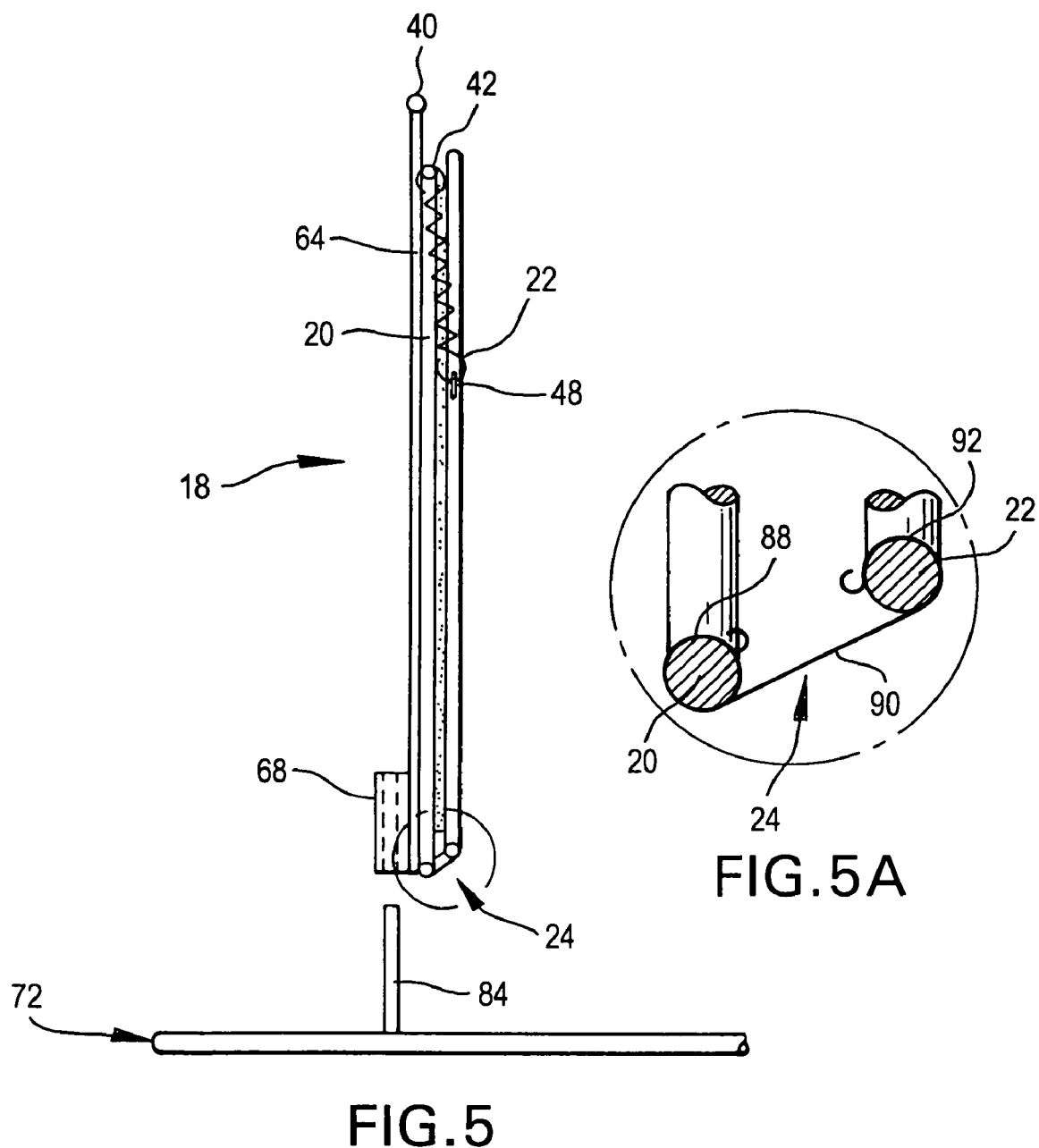
FIG. 5 is a side elevational view of a basket, in assembled condition, poised above the upstanding pins on the racking grid.
FIG. 5A is a view, on an enlarged scale, of the fragment of the basket shown within the circle on FIG. 5.

Hinge clips 24 and 26 are formed of spring metal, and are identical in configuration. The hinge clips are attached to the bottom of grate 20 and the leading edge 39 of second grate 22, and allow the racing grids to pivot independently of one another. Additional details of hinge clips 24, 26 are shown in FIG. 5A and are described at a later point in the specification.

Handle 40 on first grate 20 comprises a horizontal arm 62 and a pair of spaced, vertically extending legs 64 and 66; arm 62, and legs 64 to 66, define an inverted U-shaped handle 40. A hollow receptacle 68 is located at the lower end of leg 64, and another hollow receptacle 70 is located at the lower end of leg 66.

Figure 3:
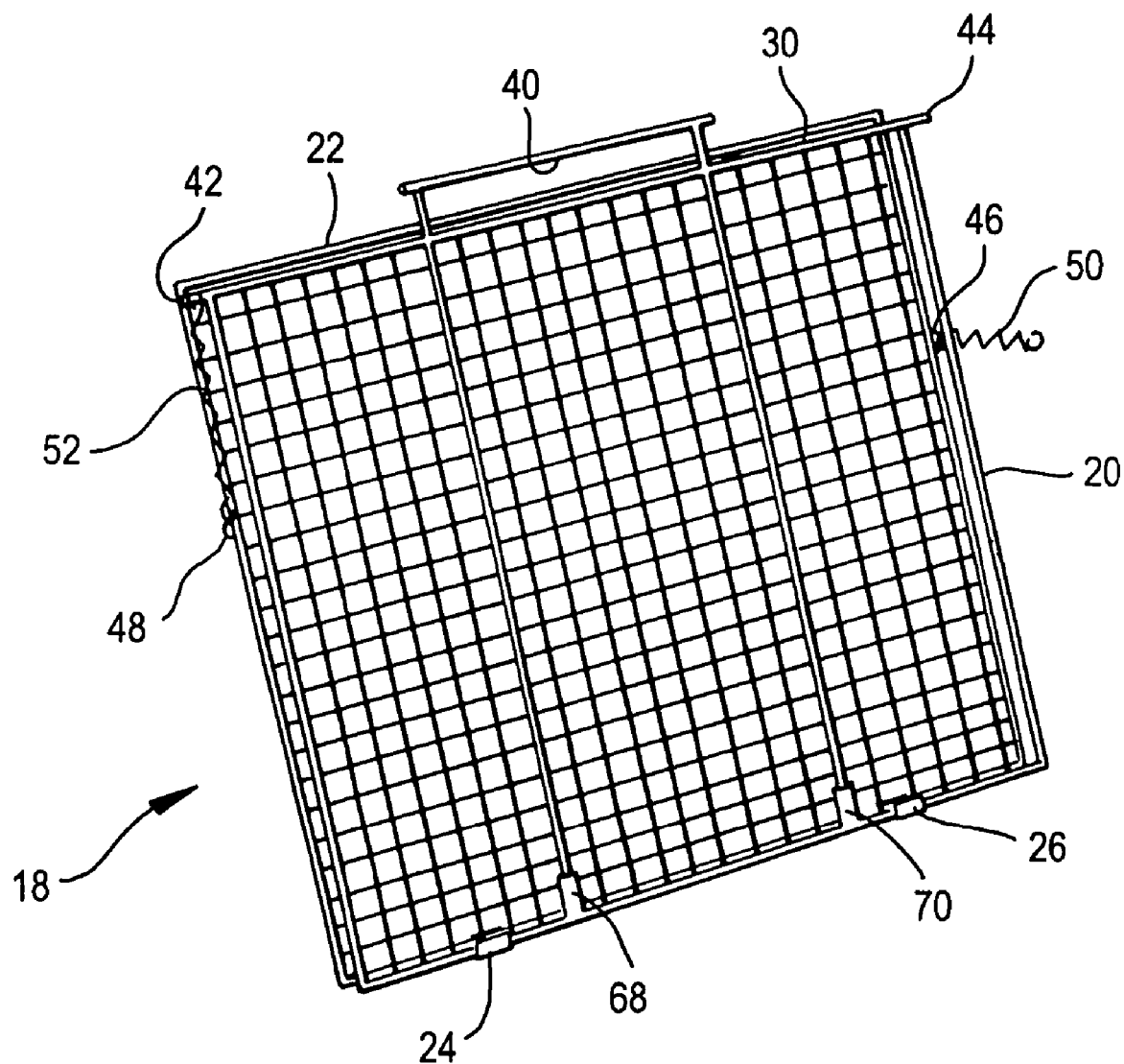
FIG. 3 is a perspective view showing the basket of FIG. 2 in assembled condition.

FIG. 3, shows basket 18 in its closed position. Tension springs 50, 52 apply a biasing force to press the first grate 20 and second grate 22 toward each other to retain the jerky to be dehydrated therebetween. Tension spring 52 extends between anchor 48 on second grate 22 and extension 42 on upper horizontal rod 30 on first grate 20. Tension spring 50 extends between anchor 46 on second grate 22 and extension 44 on rod 30 on first grate 22. Grate 22 has been pivoted 90° from the orientation shown in FIG. 2, so that grates 20, 22 are parallel to, but spaced from, one another. Hinge clips 24, 26 enable such pivotal motion. Receptacles 68 and 70 are located on the exterior of legs 64 and 66 of second grate 22, when the grates 20, 22 are biased toward one another to define a basket 18.

Figure 4:
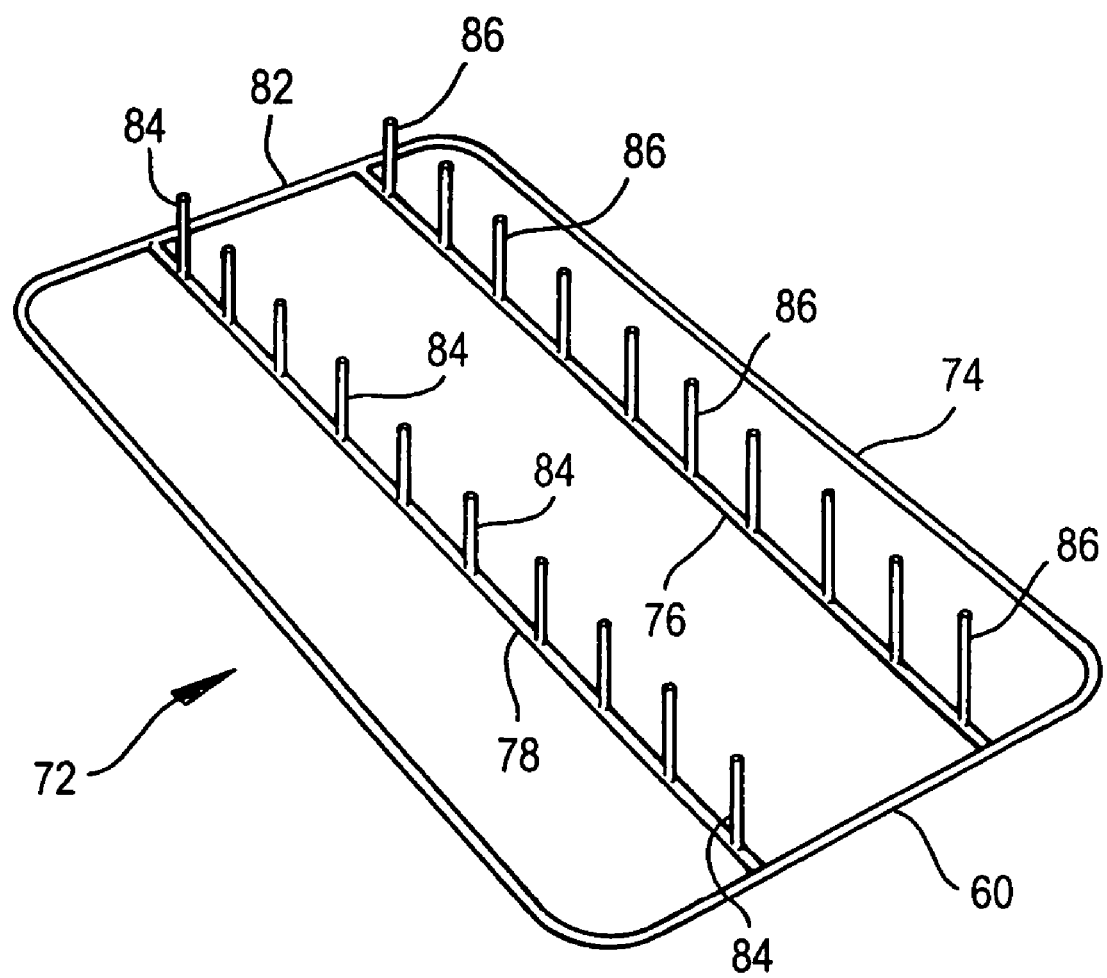
FIG. 4 is a perspective view of the racking grid, with several pairs of upstanding pins.

FIG. 4 shows racking grid 72 for retaining several baskets 18 loaded with jerky to be dehydrated. Racking grid 72 comprises a rectangular base 74 with spines 76, 78 extending between the side walls 80, 82 of the grid. The spines are parallel to one another, and are spaced apart a distance equal to the distance between receptacles 68, 70 on first grate 20. Pairs of pins 84, 86 project upwardly from spines 76, 78, to receive receptacles 68, 68 on first grate 200.

FIG. 5 shows basket 18, filled with ground jerky or a similar product, about to be lowered onto racking grid 72. Receptacle 68 slips over pin 84 and receptacle 70 slips over pin 86; the engagement of the pair of receptacles with the pair of pins ensures that each basket 18 is securely retained in a vertical orientation.

FIG. 5A shows the structural details of hinge clip 24 in greater clarity; hinge clips 24 and 26 are identical. Hinge clip 24 comprises a C-shaped hook 88, an intermediate flat body 90, and a reversely oriented C-shaped hook 92. Hooks 90 and 92 fit about first and second gates 20 and 22, respectively, and permit the grates to be pivoted, independently of one another, into a vertical plane to define basket 18. The hinge clips are formed of spring steel and possess a resilient quality.

Figure 6:
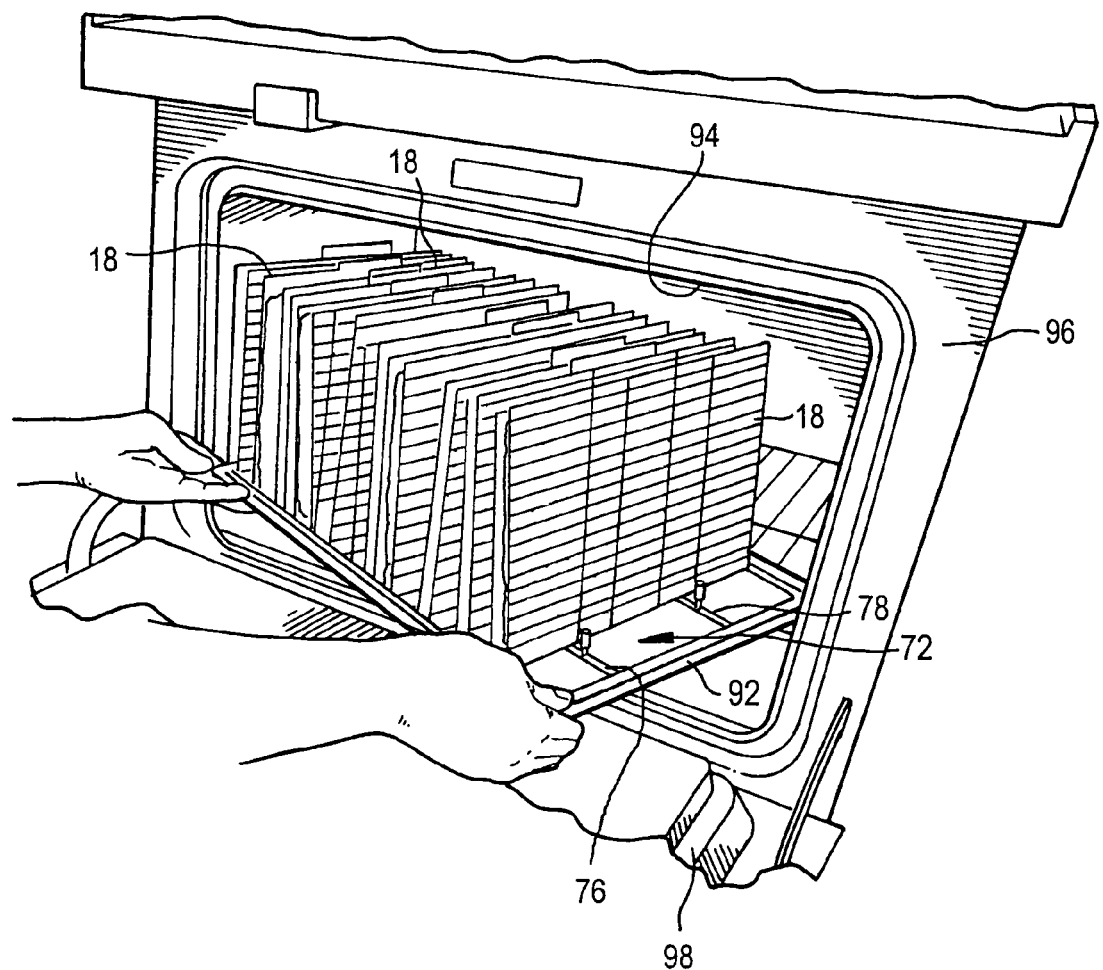
FIG. 6 shows a tray, with several baskets secured in vertical orientation by the racking grid, being inserted into an oven in a kitchen stove.

FIG. 6 shows racking grid 72, placed within a metal pan or tray 92; the racking grid contains several baskets 18, filled with jerky, in a vertical orientation. Ten or more baskets 18 may be secured to each racking grid 72. Tray 92, with loaded racking grid 72, is placed into pan 92 which is inserted into the oven 94 of a conventional kitchen stove or range 96.

In one test performed by applicants' oven 94 was preheated to 220° F.; the loaded tray and racking grid 72 was placed in the oven and the stove was closed for the first thirty minutes thereafter. Door 98 of the oven was retained slightly ajar during the remainder of the two hour dehydrator process by a chuck or stop (not shown). Holding oven door 98 slightly ajar allowed the moisture driven from the jerky, by the heat supplied by the oven during the dehydration process, to escape. Consequently, the jerky dried evenly at relatively low temperatures.

ALTERNATIVE EMBODIMENTS

Various modifications and revisions will occur to the skilled artisan after reviewing the foregoing description of applicants' invention. For example, form 10 could retain marinated meat strips, rather than ground jerky; the strips could be trimmed to fit within the form 10 and basket 18. Form 10 could also receive a unitary strip of marinated meat, trimmed to size, as a starting point in the dehydration process.

Vertically oriented baskets 18 may also be used for grilling and broiling, thus enhancing the versatility of applicants' dehydrator. The products to be dehydrated may include a variety of meats, fruits, vegetable, and herbs. While FIG. 6 shows a conventional kitchen stove, the invention may find application with convention ovens, which produce a controlled circulation of heated air currents, further reducing the time needed to achieve uniform, and thorough, dehydration of the product retained within each spring-loaded basket 18.

Although the preferred embodiment of the invention utilizes a generally rectangular open form 10 to define a patty of jerky prior to cooking same, the form 10 is not required when the dehydrator is cooking fruits, vegetables, or herbs. A charge of such foods may be placed in the basket prior to closing same; the appropriate dimension of the charge to fill the basket to a suitable level can easily be determined by the user of the appliance.

Since other modifications and revisions could be achieved without departing from the spirit of the invention, the appended claims should be broadly construed in a manner consistent with the scope of the invention. The claims should not be limited to their literal terms, under such construction.

We claim:

1. A food dehydrator including a basket for retaining a food product to be dehydrated, said basket comprising:
   a) a first grate defined by spaced vertically extending parallel rods extending between a first transverse rod at the upper end of the grate and a second transverse rod at the lower end of the first grate;
   b) a second grate defined by spaced horizontally extending parallel rods extending between a first side member and a second side member situated parallel to each other on opposite sides of the second grate;
   c) at least one hinge clip secured to the lower ends of said first and second grates to permit pivotal movement of said grates;
   d) extensions formed on the opposite ends of said first transverse rod of said first grate, and anchors formed on the first and second side members of said second grate;
   e) said extensions and said anchors being located at different elevations along the vertical extent of said basket; and
   f) springs extending at an acute angle between said anchors and said extensions to bias one of said grates upwardly toward the other grate and securely retain the food product placed within the perimeter of the basket.

2. A food dehydrator as defined in claim 1, wherein said extensions are formed at the opposite ends of said first transverse rod at the upper end of said first grate.

3. A food dehydrator as defined in claim 1, wherein said anchors are formed on said first side member and said second side member of said second grate.

4. A food dehydrator as defined in claim 1, wherein a handle is joined to the transverse rod of said first grate, said handle comprising a horizontally oriented arm with a first and a second leg depending therefrom toward the transverse rod at the bottom of said first grate.

5. A food dehydrator as defined in claim 1, further comprising a racking grid, said racking grid comprising at least one spine with pins projecting upwardly therefrom, and means on said basket to receive said upstanding pins and lock said basket in a vertical orientation.

6. A food dehydrator as defined in claim 5, wherein said means on said basket to receive the upstanding pins comprises receptacle tubes that slip over said pins.

7. A food dehydrator as defined in claim 5, wherein said rack further includes two spaced spines, extending parallel to one another.

* * * * *